G. DALÉN.
REGULATING DEVICE FOR THE TEMPERATURE OF HEATING FLUID IN HEATING SYSTEMS.
APPLICATION FILED APR. 4, 1918.
1,319,047.
Patented Oct. 21, 1919.
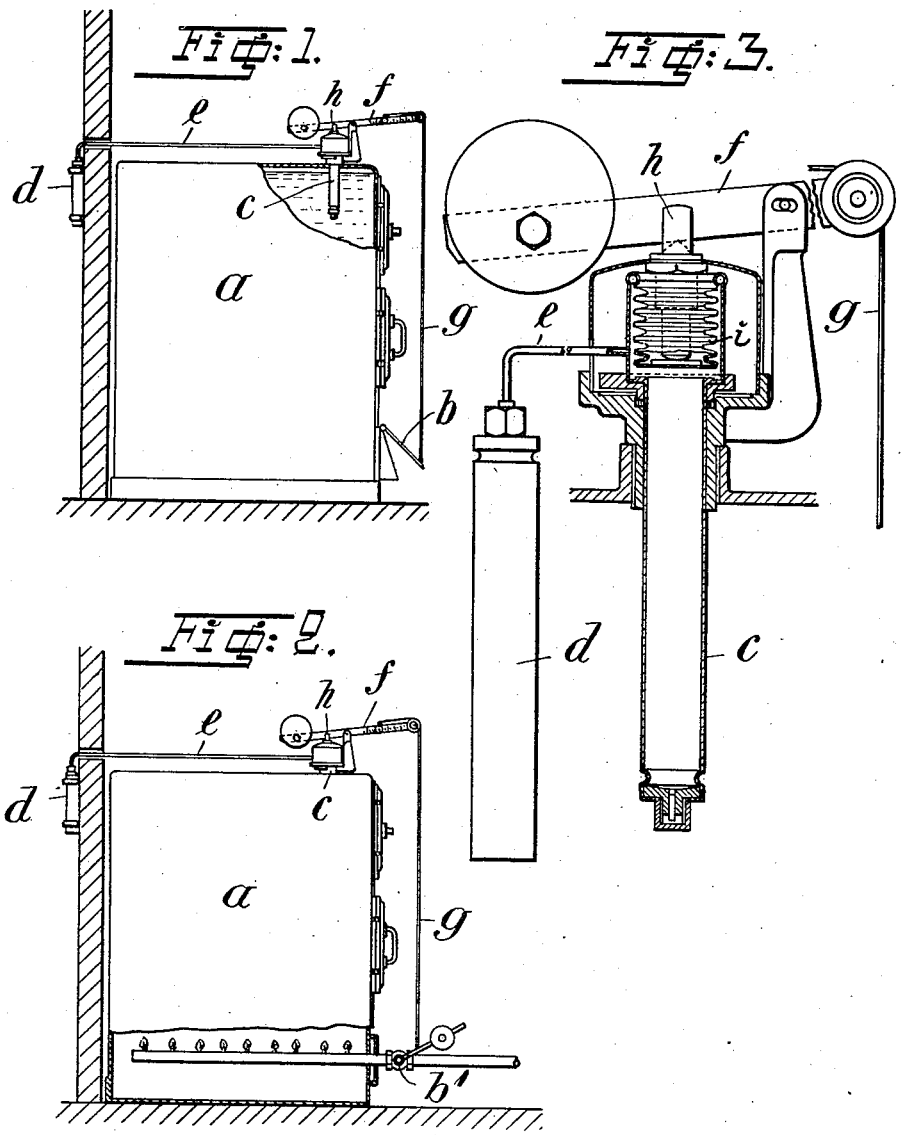
INVENTOR:
Gustaf Dalén
By Wm Wallace White
ATTY.

UNITED STATES PATENT OFFICE.

GUSTAF DALÉN, OF SKÄRSÄTRA, LIDINGÖN, SWEDEN.

REGULATING DEVICE FOR THE TEMPERATURE OF HEATING FLUID IN HEATING SYSTEMS.

1,319,047.  Specification of Letters Patent.  Patented Oct. 21, 1919.

Application filed April 4, 1918. Serial No. 226,775.

*To all whom it may concern:*

Be it known that I, GUSTAF DALÉN, a subject of the King of Sweden, residing at Skärsätra, Lidingön, Sweden, have invented new and useful Improvements in Regulating Devices for the Temperature of Heating Fluid in Heating Systems, of which the following is a specification.

The automatic regulation of the draft of or the feeding of fuel into the fire places of heating systems, for instance such ones working with circulating hot water, which commonly are used in smaller buildings, hitherto has been effected by a thermostatic device placed upon the hot water boiler. The movements of this thermostatic device by means of suitable mechanical means are transmitted to the damper of the said boiler or to its fuel feeding device in such a manner that the draft or the feeding of the fuel is reduced when the temperature of the hot water rises to a certain point, while the draft or the feeding increases with a falling temperature of the said water, the consumption of the fuel thus becoming automatically regulated corresponding to the consumption of heat.

Although this method of regulation is very advantageous for controlling the consumption of fuel, when the outer temperature changes, it is, however, not possible to obtain in this way during variations of the outer temperature a constant temperature in a room without simultaneously increasing or decreasing the quantity of water circulating through the radiators of the said room, because the heat of said water is maintained comparatively constant and therefore, in order to maintain a constant temperature in the room it is necessary to increase or decrease the volume of water circulating through the radiators in proportion to the changes in temperature of the atmosphere. This increase or decrease of the quantity of water hitherto has been produced in different ways, usually by means of a thermostatic device placed in the room and directly or indirectly connected to a valve, regulating the supply of hot water to the radiators in such a manner that this valve is opened or throttled according to the variations of the temperature of the room.

The present invention refers to an apparatus by means of which an automatic regulation of the temperature of the heating fluid in relation to the variations of the temperature of the outer air is accomplished. The apparatus generally consists of two or more thermostats connected with one another, of which one or more are acted upon by the heating fluid, while one or more are exposed to the outer air. Both sets of such thermostats by means of a common member for transmission of force are connected to a device for the regulation of the draft or the fuel feeding device of the boiler. These two sets of thermostats thus regulate each *per se* the heating of the boiler as occasion requires. On account of this coöperation and because only the sum of their actions is transmitted by means of a common force transmitting device to the draft-regulating or fuel-feeding device, the latter thus will be brought into a position corresponding to the actual requirement. If thus the outer temperature as well as that of the heating fluid rises, the two thermostats coöperate for throttling the draft or the feeding of the fuel, but if the outer temperature falls more than corresponding to the normal temperature of the heating fluid, the difference produces an effort of the force transmitting device to increase the draft or the feed of fuel.

By adjusting the dimensions of a radiator according to a certain room or by adjusting its inlet opening in such a manner that it becomes sufficient for a normal heating of the room at a certain temperature of the outer air, it becomes thus possible to maintain the normal temperature of the said room, even at a decrease of the outer temperature, by raising the temperature of the heating fluid (for instance water) passing through the radiator, as it is also possible at an increasing outer temperature to maintain the normal temperature of the room by reducing the temperature of the water circulating through the radiator.

Hitherto in such cases the temperature of the heating fluid usually has been maintained at a constant degree and the temperature of the room has been regulated by increasing or decreasing the quantity of heating fluid circulating through the radiator in a unit of time.

In the accompanying drawing Figure 1 illustrates a heating boiler arranged according to the invention, where the two thermostats act upon the damper of the boiler by means of a common force transmitting device; Fig. 2 illustrates the same boiler and thermostats acting upon the fuel feeding valve of the boiler and Fig. 3 illustrates the two thermostats (partially in section) connected to one another, and the force transmitting device belonging to them.

$a$ is the heating boiler, $b$ its damper, $c$ and $d$ the thermostats the one $d$ placed in the outer air and the other $c$ in contact with the water of the boiler. $h, f, g$ is the force transmitting device by means of which the common action of the thermostats is transmitted to the damper $b$ (Fig. 1) or to the fuel feeding valve $b^1$ (Fig. 2).

The thermostats $c$ and $d$ according to Figs. 1–3 consist of closed metal casings which, as well as the conduit $e$ connecting them, are completely filled with a liquid (for instance acetone or petroleum) having an essentially greater coefficient of expansion than that of the surrounding casing. With the casing $c$ there is connected an expansion member $i$ which on the drawing is illustrated as a bellows, placed in the casing and surrounded by the sensitive liquid. At the expansion of that liquid by heat the bellows is compressed and lifts a pin $h$, resting upon its bottom, which pin thereby turns one end of a double lever $f$, causing the other end of it to be lowered and by means of a wire connection or the like to close the damper $b$ or to throttle the valve $b^1$. The bellows $i$ of course may be turned in a position opposite to that shown in Fig. 3, so that its bottom turns upward, in which case the bellows must be filled with the sensitive liquid.

The operation of the thermostats is as follows:—

If the outer temperature falls so much that the heat of the heating fluid in the boiler at that time is not sufficient for maintaining the temperature in the room to be heated at the degree desired, the liquid in $d$ and the conduit $e$ is contracted and the bottom of the bellows $i$ sinks, whereby the damper is lifted or the fuel valve opened, the combustion thereby becoming more rapid and the water in the heating conduit more hot. If the outer temperature falls but the temperature of the heating water simultaneously is raised, the two thermostats counteract one another and the damper or the fuel valve remains in its position.

Having now particularly described the nature of my invention and the manner of its operation, what I claim is:

In combination, a bellows thermostat, a casing inclosing the thermostat, a second casing inclosing the first casing and spaced therefrom, a pin slidable in said casings and thermostat and projecting from the second casing, said pin engaging the lower end of said thermostat, a fluid receptacle in direct communication with the first casing, a second fluid receptacle, a conduit connecting said second receptacle to the first casing, and means operable by said pin for controlling a heating apparatus.

In testimony whereof I have signed my name to this specification in the presence of two subscribing witnesses.

GUSTAF DALÉN

Witnesses:
JACOB BAGG,
WM. BEMAR BOMAN.